(12) United States Patent
Yairo et al.

(10) Patent No.: US 6,231,805 B1
(45) Date of Patent: May 15, 2001

(54) INJECTION MOLDING METHOD

(75) Inventors: Takashi Yairo, Osaka; Takashi Morimoto, Higashiosaka; Sunao Yamasaki, Ikoma; Atsushi Honjo, Katano, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/309,893

(22) Filed: May 11, 1999

(51) Int. Cl.⁷ .............................. B29C 45/22; B29C 49/06
(52) U.S. Cl. ...................... 264/500; 264/572; 264/297.2; 264/328.8
(58) Field of Search .................................. 264/40.1, 40.7, 264/40.3, 572, 297.2, 328.8, 500; 425/145, 130

(56) References Cited

U.S. PATENT DOCUMENTS

| | | | |
|---|---|---|---|
| 5,135,703 | * | 8/1992 | Hunerberg et al. ............... 264/572 |
| 5,707,659 | * | 1/1998 | Erikson ............................. 264/572 |
| 5,773,038 | * | 6/1998 | Hettinga ........................ 264/328.8 |
| 5,882,693 | * | 3/1999 | Silkowski et al. ................ 264/572 |
| 5,919,492 | * | 7/1999 | Tarr et al. ...................... 264/328.8 |
| 5,922,363 | * | 7/1999 | Beck et al. ..................... 264/328.8 |

\* cited by examiner

*Primary Examiner*—Jill L. Heitbrink
(74) *Attorney, Agent, or Firm*—Parkhurst & Wendel, LLP

(57) ABSTRACT

There is provided a molding method for performing injection molding by using a multi-cavity hot-runner mold having a plurality of valve gates, wherein a proper holding pressure and the like are set for each cavity, a pressure holding step can be carried out, a plurality of products having an appearance free from such a defect as a sink mark can be obtained, the pressure in the cavity can be reduced by a gas pressure, and a necessary mold clamping force can be decreased. A valve for a first cavity is closed after the filling into the first cavity is finished, and a valve for a second cavity is concurrently opened to perform the filling into the second cavity. When injection is effected into each cavity in succession, a gas is injected into the filled resin, thereby to carry out a pressure holding step. The same pressure holding step is carried out for a third cavity and the succeeding cavities. As a result, a plurality of products having an appearance free from such a defect as a sink mark can be obtained. Also, the pressure in the cavity can be reduced by a gas pressure, and a required mold clamping force can be decreased.

7 Claims, 1 Drawing Sheet

INJECTION MOLDING METHOD

FIELD OF THE INVENTION

The present invention relates to a molding method using a hot-runner mold with multiple cavities of the same or different shape having a plurality of valve gates.

BACKGROUND OF THE INVENTION

In a conventional injection molding method in which injection molding is performed for each cavity in succession by using a multi-cavity hot-runner mold having a plurality of valve gates, a valve for a first cavity is closed after the filling into the first cavity is finished, and at the same time a valve for a second cavity is opened to perform the filling into the second cavity. For a third and the succeeding cavities, injection molding is performed in the same way.

However, the aforementioned molding method has a problem in that a surface sink mark and the like are produced in the appearance of a product. Also, it has a problem in that a large mold clamping force is needed to completely fill each cavity.

Accordingly, an object of the present invention is to provide an injection molding method for performing injection molding for each cavity in succession by using a multi-cavity hot-runner mold, wherein a surface sink mark or the like is not produced in the appearance of a product.

SUMMARY OF THE INVENTION

The injection molding method in accordance with the present invention is characterized in that a gas is injected into a cavity into which a molding material has been filled to carry out a pressure holding step, thereby to effect injection for each cavity in succession.

An object of the present invention is to provide an injection molding method in which a surface sink mark or the like is not produced in the appearance of a product.

According to a first mode of the invention, the injection molding method for performing molding by using a multi-cavity hot-runner mold having a hot runner valve gate for each cavity, comprises: a molding material filling step in which the valve gate for a cavity into which a molding material has been filled is closed and the valve gate for a cavity into which the molding material is to be filled next is opened, so that injection is effected into each cavity in succession; and a pressure holding step in which a gas is injected into the molding material having been filled. Also, the injection molding method is characterized in that a pressure holding operation in which a gas is injected into each molding material having been filled is repeated successively in the order of the filling of the molding material into each cavity, and in that a gas having an injection pressure set for each cavity is injected thereby to hold a pressure in the molding material in each cavity.

By this method in which after a cavity has been filled, the filling into the next cavity is started, a plurality of products having an appearance free from such a defect as a surface sink mark or the like can be obtained. Also, the pressure in the cavity can be reduced by the gas pressure, so that a required mold clamping force can be reduced.

According to a second mode of the invention, the injection molding method for performing molding by using a multi-cavity hot-runner mold having a hot runner valve gate for each cavity, comprises: a step of starting filling another cavity with a molding material, while a particular cavity is being filled with the molding material; and a step of carrying out the molding by repeating an operation in which the valve gate to the cavity having been filled with the molding material is closed and a gas is injected into the mold material having been filled, thereby to hold a pressure therein.

In addition to the effects of the first mode of the present invention, this method, in which the filling of the next cavity is started while a particular cavity is being filled, enables it to shorten the time taken to complete the molding of all products because the filling of the molding material into a plurality of cavities can be performed in parallel.

DESCRIPTION OF THE EMBODIMENTS

Figure 1:
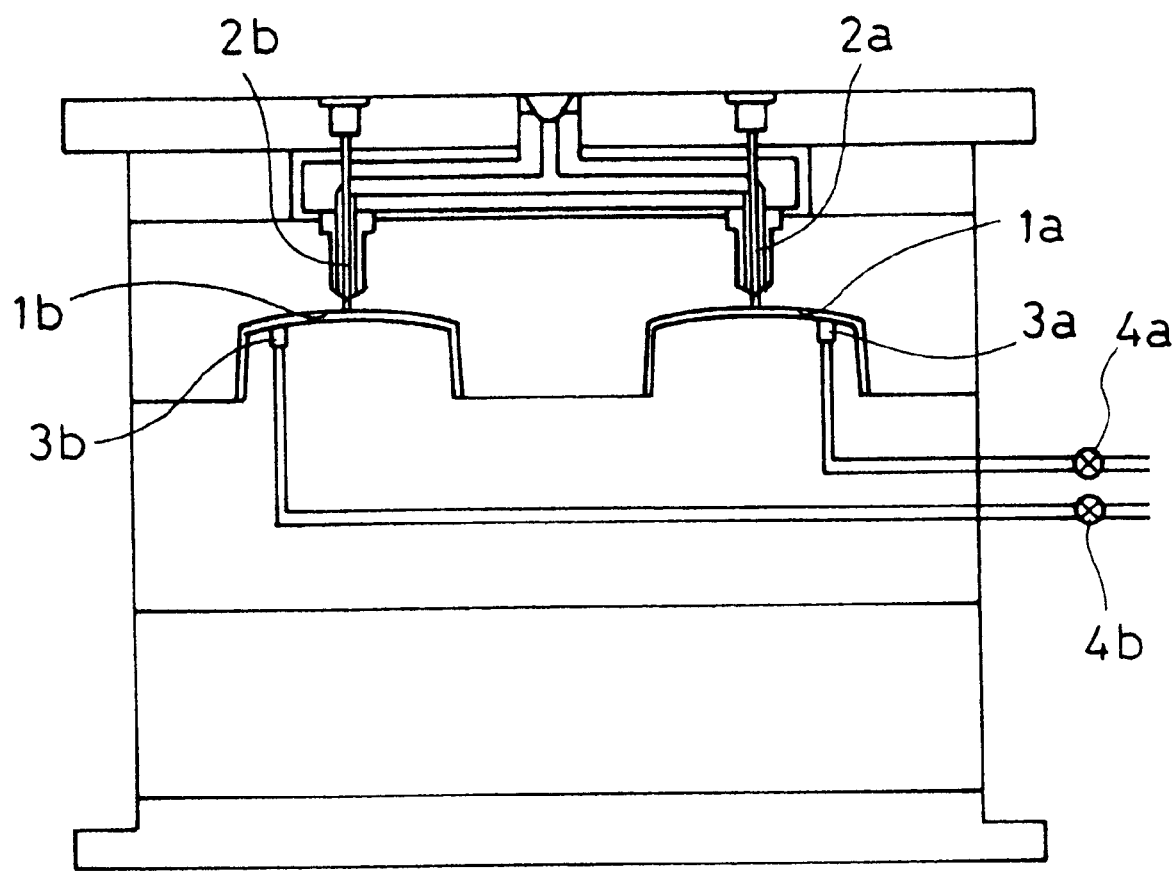
FIG. 1 is a sectional view of a mold used for carrying out an injection molding method in accordance with the present invention.

A specific embodiment of an injection molding method in accordance with the present invention will be described below with reference to the accompanying drawing.

FIG. 1 shows a multi-cavity hot-runner mold used for carrying out an injection molding method in accordance with the present invention. In this figure, the mold has a first cavity $1a$ and a second cavity $1b$, and two products molded in cavities $1a$ and $1b$ are single pieces. The first and second cavities $1a$ and $1b$ have hot runner valve gates $2a$ and $2b$, respectively, and the timing of opening/closing the valve gates $2a$ and $2b$ may be set arbitrarily.

Also, the first and second cavities $1a$ and $1b$ have gas injection ports $3a$ an $3b$, respectively, for injecting a gas into a filled resin or a molding material. The gas injection ports $3a$ and $3b$ are provided with gas control valves $4a$ and $4b$, respectively, for controlling the injection and discharge of the gas.

Embodiment 1

In the above-described mold in which the valve gate $2a$ is closed after the filling of the resin into the first cavity $1a$ is finished, and concurrently the valve gate $2b$ for the second cavity $1b$ is opened to perform injection in succession after the filling of the resin into the first cavity $1a$ is finished, a gas is injected into the resin filled into the first cavity $1a$ from the gas injection port $3a$ through the gas control valve $4a$. The kind of the gas is an air or an inert gas. The gas has a pressure set in advance according to the projected area of a product. Specifically, the gas pressure is set to about two-thirds of a peak value of a filling pressure of the resin when the filling pressure of the resin into the first cavity $1a$ is 400 kg/cm$^2$. For the gas injected into the first cavity $1a$, the injection pressure is kept the same for a specified period of time (specifically, about 10 seconds), and subsequently the gas is discharged through the control valve $4a$.

After the filling of the resin into the second cavity $1b$ is finished, the valve gate $2b$ for the second cavity $1b$ is closed, and a gas is injected into the resin filled in the second cavity $1b$ from the gas injection port $3b$ through the gas control valve $4b$. The kind and pressure of the gas is the same as those of the gas injected into the first cavity $1a$.

For the gas injected into the second cavity $1b$, the injection pressure is kept the same for a specified period of time (specifically, about 10 seconds), and subsequently the gas is discharged through the control valve $4b$.

Thus, by injecting the gas having the set pressure into each cavity to carry out a pressure holding step, proper pressure holding can be implemented in any cavity, so that a plurality of products having an appearance free from such a defect as a sink mark or the like can be obtained. Also, the pressure in the cavity can be reduced by the gas pressure, so that a mold clamping force required can be decreased.

Regarding the timing of the injection of the resin into the first and second cavities 1a and 1b and the timing of the injection of the pressure holding gas, in both cases where the resin is filled into the second cavity 1b after the filling of the resin into the first cavity 1a is finished and where the filling of the resin into the second cavity 1b is started during the filling of the resin into the first cavity 1a, a satisfactory result was obtained by successively injecting the gas into the resin in each cavity into which the resin has been filled to carry out the pressure-holding step.

Although a description has been made by taking the mold having two cavities as an example in the aforementioned embodiment, the same may be said of a mold having three or more cavities. That is, a satisfactory result was obtained by carrying out in succession the molding material filling step and the pressure holding step in which the gas is injected into the molding material after the filling thereof is finished. Specifically, the timing is controlled by a signal at the time of opening/closing the valve gate or a signal transmitted from a molding machine in the molding step, and a timer. In such a mold, when the valve for the first cavity is closed after the filling into the first cavity is finished, and the valve for the second cavity is concurrently opened to carry out the filling into the second cavity, thereby to fill out each cavity with the resin in succession, a gas is injected into the filled resin through the injection port to carry out the pressure holding step. The same pressure holding step is carried out for the third and the succeeding cavities as well. Thus, a proper holding pressure and the like are set for each cavity to carry out the pressure holding step.

As described above, according to the injection molding method of the present invention, in implementing injection molding using the multi-cavity hot-runner mold, a gas is injected in the cavity which has been filled with a molding material, thereby to carry out the pressure holding step and to effect injection into each cavity in succession. As a result, the pressure holding step can be carried out by setting a proper holding pressure for each cavity, and a plurality of products having an appearance free from such a defect as a surface sink mark or the like can be obtained. Also, the pressure in the cavity can be reduced by the gas pressure, and the required mold clamping force can be decreased.

What is claimed is:

1. An injection molding method for molding material to form a product, comprising:

providing a hot runner mold with at least a first cavity and a second cavity, a hot runner valve gate for introducing molding material to each cavity, and a separately arranged gas injection port to introduce gas to each cavity;

setting a different pre-selected gas pressure for each cavity lower than a respective molding material filling pressure for each cavity;

filling a first cavity with molding material;

closing the valve gate of the first cavity;

opening the valve gate of the second cavity;

filling a second cavity with molding material;

injecting gas, at a pre-selected pressure, via the gas injection ports into cavities containing molding material, and thereby performing a pressure holding step.

2. The injection molding method according to claim 1, wherein a pressure holding operation in which a gas is injected into each molding material having been filled is repeated successively in the order of the filling thereof into each cavity.

3. The injection molding method according to claim 1, wherein a gas is injected for a predetermined period of time, and is subsequently discharged.

4. The injection molding method according to claim 1, wherein the molding material is a resin.

5. An injection molding method for molding material to form a product, comprising:

providing a hot runner mold with at least a first cavity and a second cavity, a hot runner valve gate for introducing molding material to each cavity, and a separately arranged gas injection port to introduce gas to each cavity;

setting a different pre-selected gas pressure for each cavity lower than a respective molding material filling pressure for each cavity;

filling a first cavity with molding material;

filling a second cavity with molding material after commencement and prior to completion of filling of the first cavity;

closing the valve gates to the first cavity and the second cavity respectively, when each is filled with molding material;

injecting gas, at a pre-selected pressure, via the gas injection port into the first cavity and the second cavity when said valve gates are closed, thereby performing a pressure holding step.

6. The injection molding method according to claim 5, wherein a pressure holding operation in which a gas is injected into each molding material having been filled is repeated successively in the order of the filling thereof into each cavity.

7. The injection molding method according to claim 5, wherein a gas having an injection pressure set for each cavity is injected to hold a pressure.

* * * * *